US006860239B1

(12) United States Patent  (10) Patent No.: US 6,860,239 B1
Begun (45) Date of Patent: Mar. 1, 2005

(54) ANIMAL SPRAY MONITOR AND METHOD

(76) Inventor: Wayne R. Begun, 2212 S. Johnson Cir., Mesa, AZ (US) 85202

( * ) Notice: Subject to any disclaimer, the term of this patent is extended or adjusted under 35 U.S.C. 154(b) by 146 days.

(21) Appl. No.: 10/444,423

(22) Filed: May 23, 2003

(51) Int. Cl.⁷ ............................................ A01K 29/00
(52) U.S. Cl. .................................................... 119/712
(58) Field of Search ................................ 119/712, 174, 119/867, 868, 869, 905, 908; 340/573.1

(56) References Cited

U.S. PATENT DOCUMENTS

| 4,163,449 | A | * | 8/1979 | Regal ........................ 128/886 |
| 5,005,525 | A | | 4/1991 | Stanton |
| 5,226,386 | A | | 7/1993 | Thoms |
| 5,709,863 | A | | 1/1998 | Pageat |
| 6,089,188 | A | | 7/2000 | Corley |
| 6,111,509 | A | * | 8/2000 | Holmes .................... 340/573.4 |
| 6,288,643 | B1 | * | 9/2001 | Lerg et al. .................. 340/540 |
| 6,559,772 | B2 | * | 5/2003 | Zand et al. ................. 340/604 |
| 6,583,722 | B2 | * | 6/2003 | Jeutter et al. ............ 340/573.1 |
| 6,600,417 | B2 | * | 7/2003 | Lerg et al. .................. 340/540 |

* cited by examiner

Primary Examiner—Thomas Price
(74) Attorney, Agent, or Firm—John D. Lister

(57) ABSTRACT

A monitoring device alerts an animal owner immediately of a pet urine spraying occurrence. Typically, the urine sensor (s) of the device include spaced electrical conductors and are located in areas an animal has previously sprayed or is likely to spray. When urine bridges the gap between spaced electrical conductors the presence of the urine is electronically detected and a signal is emitted that activates an audible and/or visual alarm device to alert the animal owner of a spraying occurrence.

20 Claims, 3 Drawing Sheets

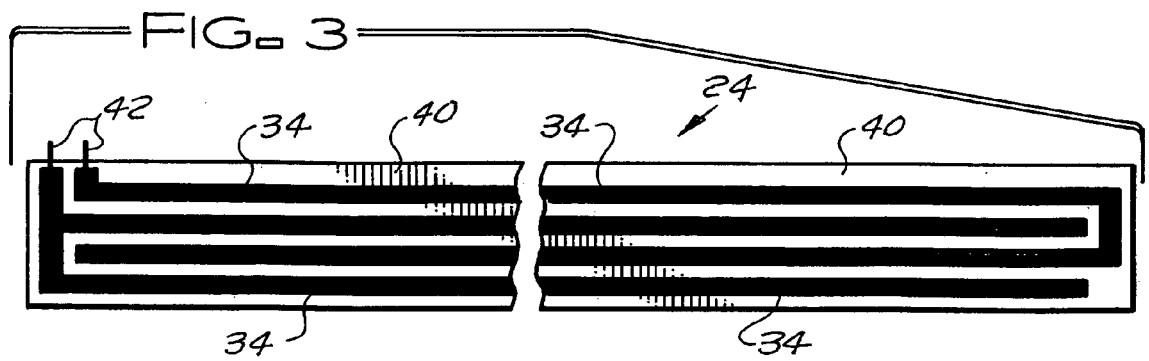
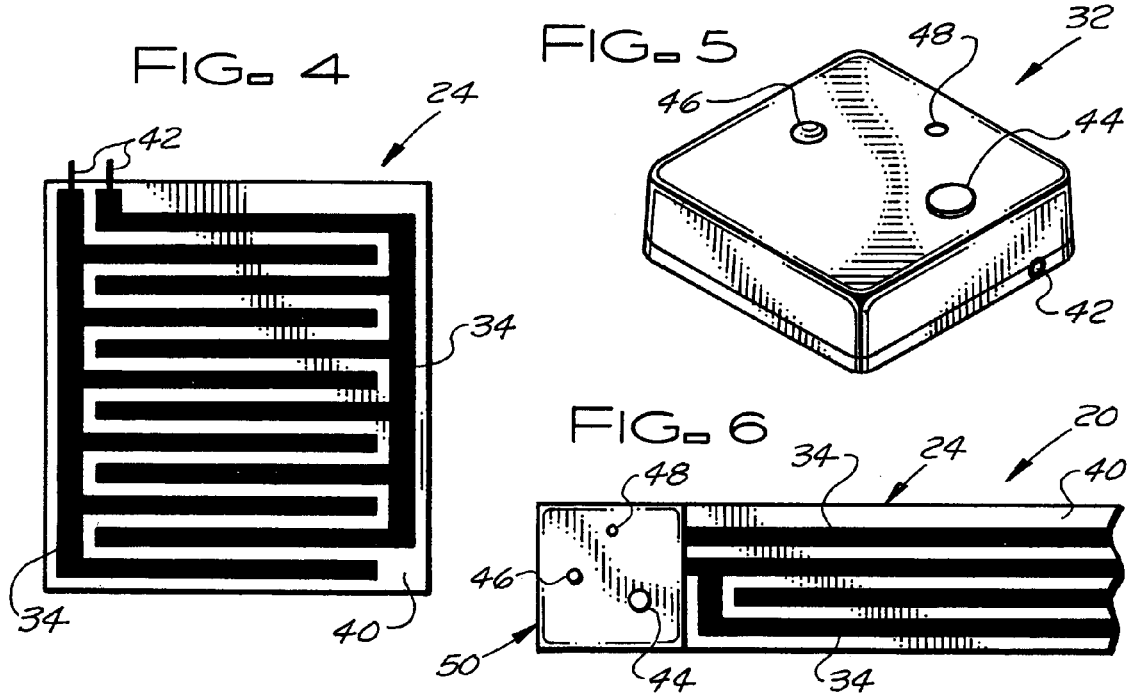
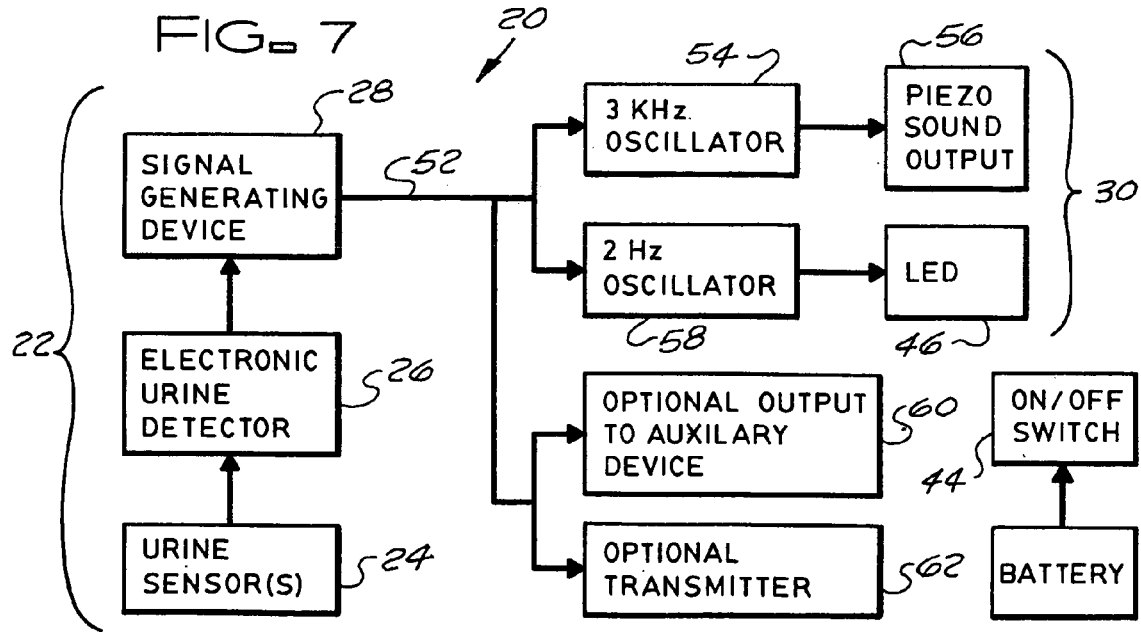

ANIMAL SPRAY MONITOR AND METHOD

BACKGROUND OF THE INVENTION

This invention relates to an animal urine spray monitor and, more specifically, to an animal urine spraying detection and alert device for mounting on generally vertical household surfaces and the method of utilizing the animal urine spraying detection and alert device for alerting an animal owner immediately when urine spraying occurs.

When an animal releases a spray of urine against a vertical targeted area, the behavior is called "spraying". Animal spraying, particularly among felines, is a widespread problem, particularly in multi-cat households. When a new animal is introduced into the environment, as an instinctual reaction to protect its territory, an existing resident may begin to spray immediately or at a later time. Left untreated, urine spraying typically causes severe damage to household furnishings, creates extremely unpleasant home odors, and reduces the resale value of the home.

The owner of a urine spraying animal is faced with the difficult choice of either getting rid of the offending animal or trying to contain and control the problem. Most pet owners would choose to control the situation, given effective tools for doing so, rather than parting with an animal with which they may have closely bonded.

Spraying behavior in felines can be unpredictable and difficult to monitor. Many cats are nocturnal in nature and may spray while their owners are asleep. Quick and difficult to follow, a cat can spray within seconds and disappear, making detection by human observation very difficult and time consuming.

Existing products and treatments to address the problem of spraying are varied. Cleaning products are marketed specifically for treating and eliminating offending stains and odors. Sterilization of the animal is promoted as a solution. Other methods include: a product that simulates cat's facial pheromones (U.S. Pat. No. 5,709,863); a shield for protecting areas from urine spray (U.S. Pat. No. 6,089,188); and garments with absorbent pads that are worn by the animals (U.S. Pat. Nos. 5,005,525 and 5,226,386). Treating cats with drug therapy and working with professional animal behaviorists are also commonly advocated as corrective measures. Each of these methods has limited effectiveness.

As male cats reach sexual maturity, they may start marking their territory. Females in heat may mark areas with their scent by releasing their urine when in heat to attract males in the vicinity. Cats already in the habit of spraying may continue that behavior after being sterilized. Because urine spraying is a form of territorial marking, neutered male and female cats feeling threatened or stressed may begin spraying even after they have been sterilized. Sterilization often reduces the incidence of feline spraying, but in many cases the spraying behavior continues.

The stress level of the animal is often a factor in spraying behavior. Stressful events, such as fighting with another resident animal, may cause the animal to become more defensive and protective of its territory, thus initiating spraying or causing more frequent spraying. Veterinarians often recommend anti-anxiety medications to reduce the stress level of spraying cats. While some cats respond positively to drug therapy, others do not respond, become lethargic, or have negative reactions to the medications, most of which were originally prescribed for humans. As with humans, extended administration of these drugs can endanger the cat's health; monitoring the cat's health through repeated trips to the veterinarian becomes extremely expensive.

Professional therapists who attempt to stop a cat from spraying may or may not be successful, depending on the individual cat. Furthermore, most cat owners cannot afford the expense of a personal cat therapist.

U.S. Pat. No. 5,709,863 (Pageat) uses a chemical composition formulation that mimics cats' facial pheromones. The product is designed to calm the feline, and is designed to prevent repeated spraying in a particular area. This product is applied directly over any sprayed locations as well any possible future spraying locations and can to be beneficial in reducing or curing spraying. Some cats however will ignore the pheromone, depending upon their stress level and spraying habits. To be effective, the product must be applied frequently in many locations, becoming too cost prohibitive for many cat owners. Successful use of the product is difficult in situations with a prolific spraying cat, or in households with multiple cats displaying marking behavior. The lack of a means for easily monitoring a treated area adds to the difficulty of follow-up evaluation.

In an attempt to prevent urine damage to surfaces, U.S. Pat. No. 6,089,188 (Corley) addresses the urine spraying issue via a shield device. The device, a spraying property protector, is comprised of a splash wall and trough to catch the urine. Narrow vertical objects, including most furniture legs, could not be equipped with this device. The device has no means of notifying the pet owner when the spraying occurs. If left unattended, urine collected in the trough produces an odor intolerable to many cat owners.

U.S. Pat. Nos. 5,005,525 (Stanton) and 5,226,386 (Thomas), disclose an animal marking and urination control training device and an absorbent urine detecting device, respectively, that are worn by a dog or other domesticated animal to prevent marking or to train the animal to be housebroken. These animal garments both include absorbent panel assemblies for absorbing urine and the Thomas garment also includes electronics for detecting urine in the absorbent panel that activates an audio alarm. Although these garments can prevent urine spraying by an animal, to prevent urine spraying, the animal must wear these animal garments. The placement of these garments on an animal can be stressful for the animal and make an already disturbed animal more anxious causing additional behavioral problems. The use of such garments also requires the washing and other maintenance of the garments and the disposal of the absorbent pads.

While the above discussed chemical treatment, shield, and absorbent animal garments are useful to varying degrees in combating the urine spraying problems encountered with certain animals, there has remained a need for a monitoring device to detect a spraying of urine by an animal and immediately alert the owner of a spraying occurrence without requiring the animal to wear a garment.

SUMMARY OF THE INVENTION

The animal urine spray monitor of the subject invention for detecting a spraying of urine by an animal on a selected wall, door, piece of furniture, curtain, drape, or other generally vertical surface and alerting an animal owner of the spraying occurrence provides a solution to the need for effectively monitoring and controlling an animal's urine spraying without requiring the animal to wear a garment. The animal urine spray monitor of the subject invention includes an electronic urine detection circuit and an alarm device. The electronic urine detection circuit includes at least one urine sensor, an electronic urine detector for electronically detecting urine on the urine sensor(s), and a signal-generating device. Th alarm device is activated by an enabling signal from the signal-generating device of the electronic urine detection circuit when the circuit detects urine on the urine sensor.

As discussed above, feline and other animal spraying behavior is typically a repetitive behavior with the animal returning to a favorite location or locations on a continuing basis. The tendency of the animal to spray the same location (s) can be used to advantage when trying to monitor and control the animal's repetitive spraying behavior. The animal urine spray monitor of the subject invention takes advantage of the animal's habitual tendency by placing the urine sensor(s) of the urine spray monitor of the subject invention in these locations so that the behavior of the animal can be monitored for frequency and severity. The spraying locations or areas can be located initially via the odor of the urine or alternately by using a "black" or ultraviolet lamp in a darkened room. Dried urine will luminesce and be easily visible under the ultraviolet light.

As mentioned above, the animal urine spray monitor of the subject invention includes an electronic urine detection circuit and an alarm device. Each urine sensor of the electronic urine detection circuit is mounted, preferably detachably mounted, on a generally vertical surface to detect a spraying of urine by an animal on the generally vertical surface. Typically, the urine sensor(s) of the electronic urine detection circuit each have first and second spaced apart electrical conductors that are electronically connected to the circuit's electronic urine detector. When the electrical resistance between the first and second electrical conductors of a urine sensor is changed by urine that bridges the first and second electrical conductors to close an open circuit between the first and second electrical conductors or to reduce the electrical resistance between the first and second electrical conductors, the electronic urine detector of the electronic urine detection circuit detects the change in electrical resistance of the electronic urine detection circuit and activates the signal-generating device which emits an enabling signal to activate the alarm device. The signal-generating device may be directly wired to the alarm device or may include transmitters for transmitting signals that are received by a receiver of the alarm device to activate the alarm device. Preferably, the animal urine spray monitor is self contained with its own power source and when the alarm device is activated, the alarm device emits both an audio and visual alarm.

Immediate detection of spraying is particularly important in minimizing damage to household furnishings and for controlling the detrimental impact of the urine odor to the home environment. Th spray alert provided by the urine spray monitor of the subject invention can give the owner of the spraying animal a tool for evaluating the effectiveness of treatments such as using pheromone spray, using drug and/or behavioral therapy, isolating the offending animal or making other adjustments to the animal's environment. Advantages provided by the subject invention include the following:

Effective tool to minimize damage to household furnishing and control detrimental impact of urine odor on the home environment through immediate detection of a spraying occurrence;

Unique tool for monitoring repetitive spraying behavior and treating sprayed surfaces in a timely manner;

Empirical data for the owner to evaluate methods being used to prevent or control spraying behavior and to make necessary adjustments;

Detection and alert when the actual spraying occurs through an alarm device which emits a beeping sound for 30 seconds, unless turned off sooner;

Delayed visual alert through an LED which blinks continually until manually turned off;

Reusable urine sensor(s);

Versatile urine sensor(s), flexible enough to be used on various types of surfaces;

Simple device installation and operation, relatively inexpensive.

As discussed above, there exists a real need for a device such as the urine spray monitor of the subject invention, which will provide an animal owner with an effective means of continuously monitoring for possible spraying behavior and for immediately alerting the owner of spraying behavior. The subject invention provides simple and inexpensive means for continuously monitoring and detecting animal urine spraying. By providing an immediate alert to the animal owner, damage to furniture and the home can be minimized. A delayed alert may also be provided for instances where the animal owner is not present at the time of the spraying. The urine spray monitor of the subject invention takes advantage of the animal's habitual tendency to return to the same location to repeat the spraying behavior. With the urine spray monitor of the subject invention, animal behavior can be monitored and treatment plans for the animal can be adjusted accordingly.

Further objects and advantages of the subject invention will become apparent from a consideration of the drawings and ensuing description.

BRIEF DESCRIPTION OF THE DRAWINGS

FIGS. 3 and 4 are front views of alternate examples of urine sensor designs for the urine sensors of the subject invention. As shown, these urine sensors have electrical connections for connecting the urine sensors by wires to the signal-generating device of the monitor.

FIG. 5 is a perspective view of a housing containing a signal-generating device and alarm device of the monitor of the subject invention and electrical connections for connecting the signal-generating device of the monitor to the urine sensor(s) by wiring.

FIG. 6 is a front view of a urine sensor that is integral with the signal-generating device and alarm device of the monitor of the subject invention.

FIG. 7 is a block diagram of a typical embodiment of the animal urine spray monitor of the subject invention as shown in FIGS. 1 and 2.

DESCRIPTION OF THE PREFERRED EMBODIMENTS

Figure 1:
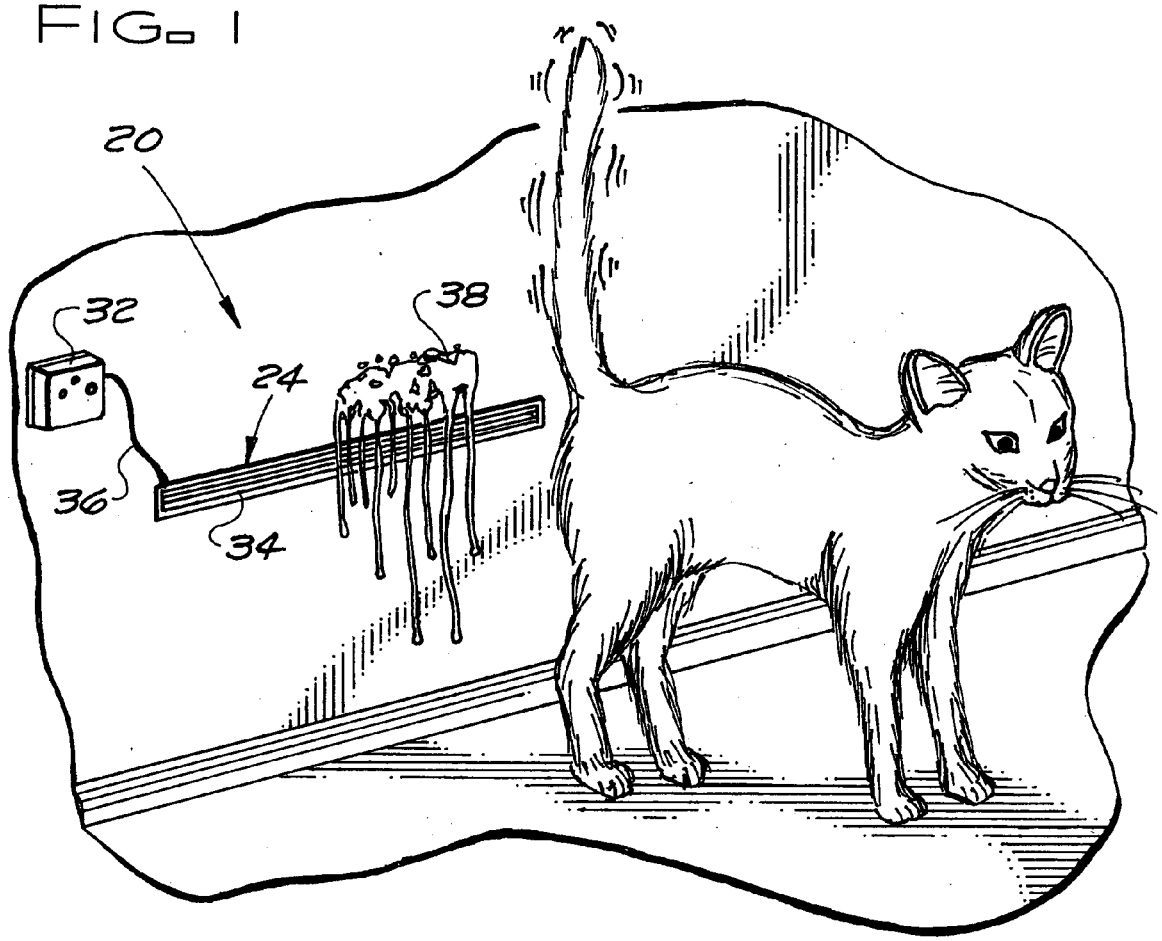
FIG. 1 is an overall view of a typical embodiment of the animal urine spray monitor of the subject invention showing a cat spraying a urine sensor of the monitor.

FIG. 1 shows a typical animal urine spray monitor 20 of the subject invention for detecting a spraying of urine by an animal on a selected wall, door, piece of furniture, curtain, drape, or other generally vertical surface and alerting an animal owner of the spraying occurrence. As shown in the block diagram of FIG. 7, the monitor 20 of FIG. 1 includes an electronic urine detection circuit 22 with a urine sensor 24, an electronic urine detector 26, and a signal-generating device 28, and an alarm device 30. In the monitor of FIG. 1, the electronic urine detector 26, signal-generating device 28 and the alarm device 30 are contained within a housing 32 that is mounted on a wall. The urine sensor 24 is also mounted on the wall at a location that the animal owner desires to monitor for urine spraying. The urine sensor 24 and the housing 32 can be permanently mounted on the wall or other mounting surface. However, for most applications, it is preferred to detachably mount the urine sensor 24 and the housing 32 on a wall and/or other mounting surface so that the urine sensor 24 and/or housing 32 can be removed without damaging the mounting surface.

The urine sensor 24 of FIG. 1 includes a pair of spaced apart conductors 34 and is connected to the electronic urine detector 26 in the housing 32 by wiring 36 so that the bridging of the spaced apart conductors 34 on the urine sensor 24 by urine will be detected by the electronic urine detector 26 to thereby activate the signal-generating device 28 to emit an enabling signal that activates the alarm device 30. Preferably, the animal urine spray monitor 20 is battery powered by a battery contained within the housing 32 so that the animal urine spray monitor is self contained, safe, and easily placed wherever needed.

Figure 2:
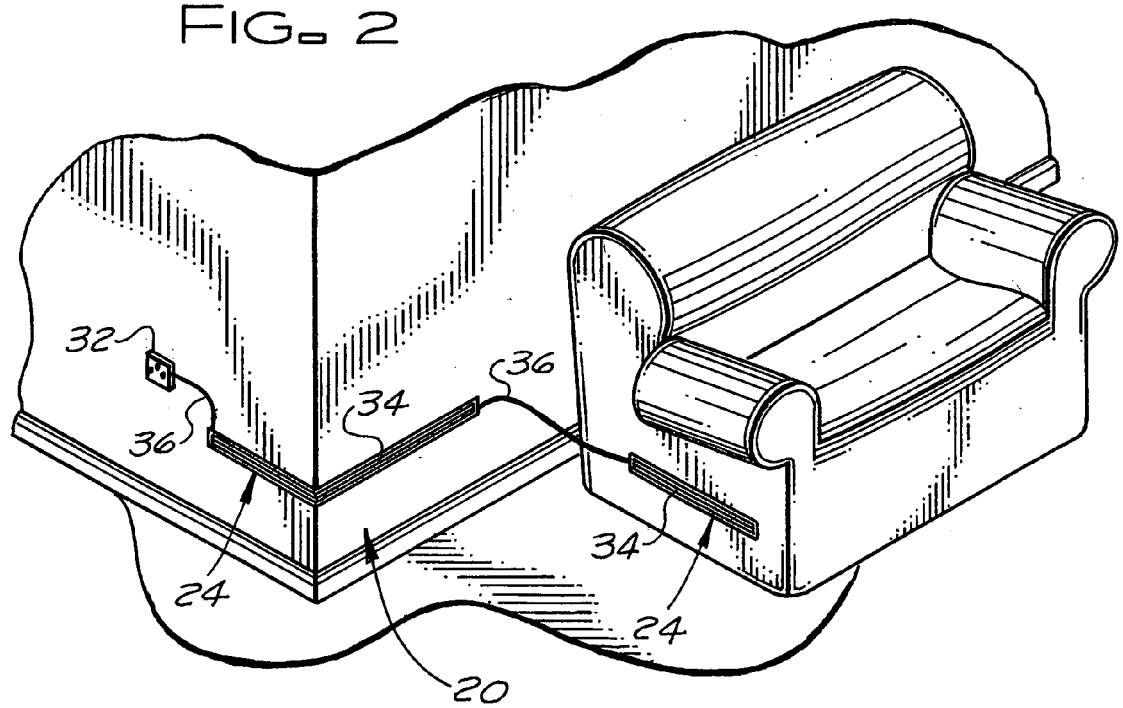
FIG. 2 is an overall view of an embodiment of the animal urine spray monitor of the subject invention wherein the monitor includes a plurality of urine sensors.

FIG. 2 shows another embodiment of the typical animal urine spray monitor 20 of the subject invention for detecting a spraying of urine by an animal on a selected wall, door, piece of furniture, curtain, drape, and/or other generally vertical surface and alerting an animal owner of the spraying occurrence. Th monitor of FIG. 2 is like the monitor of FIG. 1 except that it includes two or more urine sensors 24. The electronic urine detector 26, the signal-generating device 28 and the alarm device 30 are contained in the housing 32 that is mounted on a wall. The urine sensors 24 each include a pair of spaced apart conductors 34 and are electrically connected to each other and to the electronic urine detector 26 so that the bridging of the spaced apart conductors 34 on either urine sensor 24 by urine will be detected by an electronic urine detector 26 to thereby activate the signal-generating device 28 to emit an enabling signal that activates the alarm device 30. As shown, one of the urine sensors 24 is mounted on a corner of the wall at a location that the animal owner desires to monitor for urine spraying and the other urine sensor 24 is mounted on the side of a chair at a location that the animal owner desires to monitor for urine spraying. While the urine sensors 24 are shown connected together and to the electronic urine detector 26 in series by the wiring 36, the urine sensors 24 may also be connected to the electronic urine detector 26 by wiring in parallel or in series and parallel. The urine sensors 24 and the housing 32 can be permanently mounted on the wall or other mounting surface. However, for most applications, it is preferred to detachably mount the urine sensors 24 and the housing 32 on a wall and/or other mounting surface so that the urine sensors 24 and/or housing 32 can be removed without damaging the mounting surface.

As mentioned above, the animal urine spray monitor of the subject invention includes an electronic urine detection circuit 22 and an alarm device 30. Each urine sensor 24 of the electronic urine detector circuit 22 is mounted, preferably detachably mounted, on a generally vertical surface to detect a spraying of urine by an animal on the generally vertical surface. Typically, the urine sensor(s) 24 of the electronic urine detection circuit 22 each have first and second spaced apart electrical conductors 34 that are electronically connected to the circuit's electronic urine detector 26. When the electrical resistance between the first and second electrical conductors 34 of a urine sensor 24 is changed by urine that bridges the first and second electrical conductors 34 to close an open circuit between the first and second electrical conductors 34 or to reduce the electrical resistance between the first and second electrical conductors 34, the electronic urine detector 26 of the electronic urine detection circuit 22 detects the change in electrical resistance of the electronic urine detection circuit 22 and activates the signal-generating device 28 which emits an enabling signal to activate the alarm device 30. Preferably, the animal urine spray monitor 20 is self-contained with its own power source and when the alarm device is activated, the alarm device emits both an audio and visual alarm.

In accordance with the invention, the urine sensor or sensors 24 are appropriately positioned in the location(s) that the animal owner desires to monitor for urine spraying such as but not limited to locations where the animal, e.g. a cat, has previously sprayed. Typically, the animal will spray upon a generally vertical surface such as a wall, door, curtains, or furniture and will normally return repeatedly to spray the same location(s). In FIG. 1, a cat is shown in a typical spraying position. When spraying, the cat will raise and twitch it's tail while backing toward a generally vertical surface and will discharge a spray of urine in an approximately horizontal stream. The height of the spray stream will vary with the animal. For a cat, the urine spray stream is normally discharged from the animal at a height that is from about 16 cm to about 24 cm above the floor. Upon striking the generally vertical surface, such as a wall, door, piece of furniture, curtain, drape, or other generally vertical surface, the urine 38 will typically splatter in the pattern shown in FIG. 1 and run down the generally vertical surface. In accordance with the subject invention, the sensor(s) 24 of the animal urine spray monitor 20 will be mounted on and against the generally vertical surface(s) at the location(s) being monitored at a height above the floor that is equal to or less (preferably less) than the height at which the urine stream is normally discharged from the animal so that the urine can be detected by the urine sensor(s) 24 as the urine spray hits the generally vertical surface and sensor(s) and/or runs down the generally vertical surface and over the sensor(s) 24. When monitoring urine spraying by cats, the urine sensor(s) 24 will preferably be located no more than about 24 cm above the floor and typically, at a height from about 10 cm to about 24 cm above the floor to receive either the direct spray or the dripping runoff. Where the animal has sprayed previously, the location or locations where the animal has sprayed can be ascertained by several methods: a) by observing the animal in the act of spraying; b) by the presence of urine, determined either by direct observation or odor; and c) by the presence of urine and a spray pattern that may be determined via use of a ultraviolet or black lamp in a darkened room.

Preferably, the urine sensor(s) 24 are pliable or flexible so that the urine sensors 24 can be easily shaped to conform to the contours of a wall surface such as a corner surface, furniture surfaces and the like. Preferably, the urine sensor(s) 24 are thin, e.g. made with a thin sheet material 40 containing a printed circuit, so that the urine easily runs down and over the conductors 34 of the sensor(s) 24 and is not blocked or diverted from running over the conductors 34 by the thickness of the sensor(s). Preferably, the urine sensor(s) 24 are detachably mounted on the wall or other generally vertical surface so that the urine sensor(s) 24 can be easily removed from the wall or other generally vertical surface without marring the generally vertical surface being monitored for urine spraying. For example, the urine sensor(s) 24 can be temporarily or detachably bonded to a generally vertical surface with a thin, double-sided adhesive tape having a pressure sensitive adhesive on both sides or other adhesive backings that permit the urine sensor(s) 24 to be later easily separated from the generally vertical surface without marring the surface. As an alternative example, the urine sensor(s) 24 can be provided with small holes therein through which tacks, brads, pins, or other small fasteners can be passed to detachably secure the urine sensor(s) 24 to generally vertical surfaces.

As exemplified in FIGS. 3 and 4, the urine sensor 24 of the subject invention can be made in different sizes and configurations to best suit the location being monitored for animal urine spraying. FIG. 3 is an example of a thin, elongated urine sensor 24, such as the urine sensors utilized in FIGS. 1 and 2, that has a printed circuit of parallel spaced apart first and second electrical conductors 34 etched on one surface of a thin nonconducting or high electrical resistance carrier strip 40. The thin elongated urine sensor 24 of FIGS. 1, 2 and 3 is especially well suited for use on generally vertical surfaces such as wall, doors and the like where the owner desires to monitor a location from several inches to several feet in width.

The urine sensor 24 of FIG. 4 is designed to monitor urine spraying on a narrow generally vertical surface, such as but not limited to a table leg. The urine sensor 24 of FIG. 4 has a printed circuit of parallel spaced apart electrical conductors 34 etched on one surface of a thin nonconducting or high electrical resistance carrier 40 that is square or rectangular in shape. Urine sensors 24 of this design are especially well suited for use in monitoring locations where the generally narrow vertical surfaces being monitored are typically only several inches in width. The urine sensors 24 of FIGS. 3 and 4 are shown with standard electrical connections 42 for connecting these urine sensors through wires 36 to an electronic urine detector 26 of the electronic urine detection circuit and/or other urine sensors 24.

FIG. 5 shows a typical housing 32 that contains the electronic urine detector 26, the signal-generating device 28 and the alarm device 30 of the monitors 20 of FIGS. 1 and 2. The electronic urine detector 26 in the housing 28 has a standard electrical connection or connections 42 that enable the electronic urine detector 26 in the housing 32 to be connected to one or more urine sensors 24 through wiring 36 and that enables the electronic urine detector 26, the signal-generating device 28 and the alarm device 30 to be separated from the urine sensor(s) 24 and placed in a convenient location for the owner to observe the monitor. In addition to the electrical connection or connections 42, the housing 32 includes an on/off switch 44, an LED 46, and an opening 48 for the audio alarm and, preferably, can be detachably secured to a wall or other surface. For example, the housing 32 can be bonded to a surface with a thin, double-sided adhesive tape having a pressure sensitive adhesive on both sides or other adhesive backings that permit the housing 32 to be later easily separated from the generally vertical surface without marring the surface.

FIG. 6, shows a self-contained, battery powered embodiment of the animal urine spray monitor 20 wherein the electronic urine detector 26, the signal-generating device 28, and the alarm device 30 are contained in a housing 50 that is integral with the urine sensor 24 so that no wiring 36 is required. The housing 50 includes an on/off switch 44, an LED 46, and an opening 48 for the audio alarm. Where appropriate, the animal urine spray monitor 20 of FIG. 6 may be substituted for the wired animal urine spray monitors 20 of FIGS. 1 and 2. For example, instead of having a urine sensor 24 on the chair in FIG. 2 that is connected to the wall by wiring 36, the self-contained wireless animal urine spray monitor 20 of FIG. 6 could be mounted on the chair. The monitor 20 of FIG. 6 can be permanently or detachably secured to a wall or other mounting surface. For example, the monitor 20 can be bonded to a generally vertical surface with a thin, double-sided adhesive tape having a pressure sensitive adhesive on both sides or other adhesive backings that permit the monitor 20 to be easily separated later from the generally vertical mounting surface without marring the surface.

FIG. 7 is an exemplary block diagram of the animal urine spray monitor 20 of FIGS. 1, 2 and 6. Preferably, the animal urine spray monitor 20 of FIGS. 1, 2 and 6 is a battery powered self-contained or stand-alone monitor that cost effectively utilizes conventional commercially available components. In the block diagram of FIG. 7, an electronic urine detection circuit 22 includes one or more urine sensors 24, an electronic urine detector 26, and a signal-generating device 28, and activates an alarm device 30. When the first and second electrical conductors 34 of a urine sensor 24 are bridged by urine 38, the electronic urine detector 26 detects a change in the electrical resistance between the two conductors 34 of the urine sensor 24 and causes the signal-generating device 28 to emit an enabling signal 52 to activate the alarm device 30. The enabling signal 52 activates an audio oscillator 54 to sound a 3 KHz audio tone through a high amplitude piezo electric signal device 56 for an audio alert and activates a 2 Hz oscillator 58 to blink the light emitting diode 46 for a visual alert e.g. a red LED. In the current embodiment of the animal urine spray monitor 20, the 3 KHz audio tone beeps 3 times (at 0.5 second internals) every 3 seconds for a total of 30 seconds and then automatically ceases unless the monitor 20 is turned off with the monitor's on/off switch 40 before the 30 second time period expires. This feature prevents a continuous sounding of the alarm when the animal owner is not at home. However, the LED 46 will continue to blink indefinitely until turned off by the on/of switch 44 to alert an absent owner of a spraying event when the owner later returns to the premises. The electronic urine detector 26, signal-generating device 28 and the alarm device 30 may be contained within a housing, such as the housing 32 of FIG. 5, that is separated from and connected to the urine sensor(s) 24 by wires 36 or the electronic urine detector 26, the signal-generating device 28, and the alarm device 30 may be contained within a housing, such as the housing 50 of FIG. 6, that is an integral part of the urine sensor 24.

The oscillator 54 and piezo sound device 56 and the oscillator 58 and LED 46 may be replaced by or supplemented with additional circuitry 60 and/or 62 that include components or devices the owner desires to have activated by the electrical enabling signal 52 from the signal-generating device 28, such as but not limited to a component or device external to the animal urine spray monitor 20 for discouraging an animal from spraying. For example, the additional circuitry 60 could include a sound device to produce sound emissions at the time of a spraying occurrence at a higher frequency or frequencies above a human's hearing range but within an animal's hearing range to frighten or deter the animal from repeated spraying and the additional circuitry 62 could include a transmitter that activates a shocking device, such as a collar, worn by the animal to deliver a mild shock to the animal at the time of a spraying occurrence to deter the animal from repeated spraying.

Figures 8, 9:
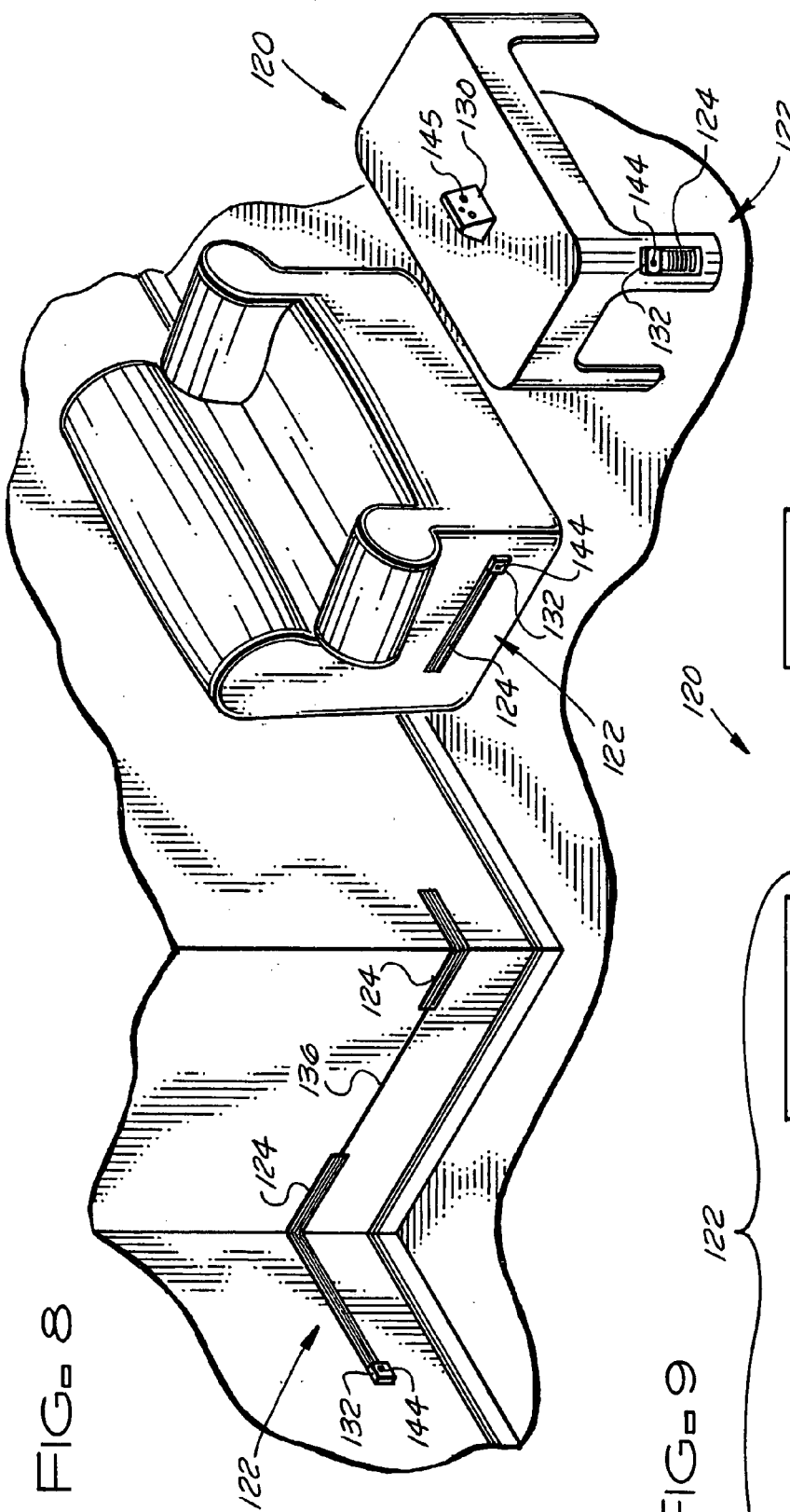
FIG. 8 is an overall view of an embodiment of the animal urine spray monitor of the subject invention wherein the signal-generating device includes a transmitter for transmitting a wireless enabling signal and alarm device includes a receiver for receiving the wireless enabling signal so that the alarm device can be easily separated from the signalmenrating device(s) and urine sensor(s).
FIG. 9 is a block diagram of a typical embodiment of the animal urine spray monitor of FIG. 8 that utilizes a wireless signal.

The animal urine spray monitor 20 may be replaced by or used in conjunction with a wireless animal urine spray monitor 120 of the subject invention that is shown in FIG. 8 and the block diagram of FIG. 9. The monitor 120 utilizes an alarm device 130 that is not wired to the signal-generating device(s) 128 and that is activated by a wireless signal from the signal-generating device(s) 128. FIG. 8 shows an overall view of a room provided with a typical embodiment of the wireless animal urine spray monitor 120. As shown in FIGS. 8 and 9, separate battery powered electronic urine detection circuits 122 each include one or more urine sensors 124, an electronic urine detector 126, and a signal-generating device 128 that are mounted on a wall, the side of a chair, and a table leg. As shown, where there is more than one urine sensor 124, the urine sensors 124 are electrically connected to each other by wiring 136. The electronic urine detector 126 and signal-generating device 128 of each electronic urine detection circuit 122 are contained along with a battery power source in a housing 132 that includes an on/off switch 144. The separate battery powered alarm device 130 is located in a convenient location for monitoring by the owner, e.g. on the table, and has an on/off switch 145. In this embodiment of the urine spray monitor 120 and as shown in the block diagram of FIG. 9, the signal-generating device 128 of each electronic urine detector circuit 122 includes a transmitter for transmitting a wireless signal 152 to the alarm device 130 when the presence of urine on a sensor 124 of the circuit is electronically detected by the electronic urine detector 126 of the electronic urine detection circuit. The alarm device 130 includes a receiver for receiving the wireless signal 152 to activate the alarm device 130. With these features, the alarm device 130 can be easily separated from the electronic urine detection circuits 122 and the need for wiring between the alarm device 130 and the signal-generating devices 128 is eliminated. The alarm device 130 may have an oscillator and piezo sound device like the alarm 30 and/or an oscillator and LED like the alarm 30 as well as additional circuitry like the additional circuitry 60 and 62 of FIG. 7.

With the inclusion in the animal urine spray monitor 120 of signal-generating devices 128 with transmitters and an alarm device 130 with a receiver, multiple electronic urine detection circuits 122 can be easily placed at different locations within a household to simultaneously monitor the multiple locations with a central alarm device 130 that may be in a different room. In addition, the visual alarm of the alarm device 130 may have different visual indicators (LEDs) that are independently activated by the signals from the signal-generating devices 128 of the different electronic urine detection circuits 122 so that an animal owner is alerted as to which of the urine sensors 124 has been sprayed. Except for the inclusion of a transmitter in the signal-generating device 128 of the electronic urine detection circuit 122, the inclusion of a receiver in the alarm device 130 of the electronic urine detection circuit 122, and the activation of the alarm device 130 by a wireless signal 152, the animal urine spray monitor 120 functions like the animal urine spray monitor 20.

In a prototype the animal urine spray monitor 20 of the subject invention, a urine sensor 24 was fabricated from a single-sided type FR4 printed circuit material that utilized a pattern of two parallel spaced apart conductors 34 etched on one side. The carrier material 40 used for the urine sensor had a thickness of 0.2 mm, a height of 2.54 cm, and a length of 70 cm inches. The electronic urine detector 26 for detecting the change in electrical resistance between the two conductors 34 on the urine sensor of the electronic urine detection circuit 22 was a high input MOSFET transistor device and the signal-generating device 28 was a microprocessor device. The high input MOSFET transistor device continuously emitted a logic signal that changed state upon detection of a change in the resistance between the electrical conductors 34 on the urine sensor 24. The microprocessor device monitored the logic signal of the MOSFET transistor device and when the microprocessor device detected a change in the logic signal of the MOSFET transistor caused by a change in the resistance between the electrical conductors 34 when the conductors were bridged by urine, the microprocessor device generated an enabling signal 52 to activate the alarm device 30.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An animal urine spray monitor for detecting a spraying of urine by an animal on a selected wall, door, piece of furniture, curtain, drape, or other generally vertical surface and alerting an animal owner of the spraying occurrence, comprising:

a first electronic urine detection circuit for detecting urine spray; the first electronic urine detection circuit including a first urine sensor having means for mounting the first urine sensor on a generally vertical surface to detect a spraying of urine by an animal on the generally vertical surface, a first signal-generating device, and a means for electronically detecting urine on the first urine sensor and activating the first signal-generating device to emit a first signal; and an alarm device that is activated by the first signal of the first signal-generating device to emit an audio and/or visual alarm.

2. The animal urine spray monitor according to claim 1, wherein:

the alarm device emits an audio and a visual alarm.

3. The animal urine spray monitor according to claim 2, wherein:

the audio alarm ceases after a selected time period and the visual alarm continues until the visual alarm is manually turned off.

4. The animal urine spray monitor according to claim 1, including:

a deterrent device that is activated by the first signal of the first signal-generating device to emit an audio deterrent of an appropriate amplitude, frequency and duration to deter an animal from repeating the spraying occurrence.

5. The animal urine spray monitor according to claim 1, including:
 a deterrent device that is activated by the first signal of the first signal-generating device to administer a behavior deterring stimulus to an animal to deter an animal from repeating the spraying occurrence.

6. The animal urine spray monitor according to claim 1, wherein:
 the electronic urine detection circuit includes the first and second spaced apart electrical conductors on the first urine sensor that are vertically spaced apart when the first urine sensor is mounted on a generally vertically surface; the electronic urine detection circuit has an electrical resistance between the first and second electrical conductors that changes when the first and second electrical conductors are bridged by urine; and the means for electronically detecting urine on the first sensor detects the change in resistance between the first and second electrical conductors.

7. The animal urine spray monitor according to claim 6, wherein:
 the first urine sensor comprises a carrier sheet strip having first and second major surfaces defined by a length and a width of the carrier sheet strip; and the first and second electrical conductors are printed on a major surface of the carrier sheet strip.

8. The animal urine spray monitor according to claim 1 wherein:
 the electronic urine detection circuit includes the first and second spaced apart electrical conductors on the first urine sensor that are vertically spaced apart when the first urine sensor is mounted on a generally vertically surface; the electronic urine detection circuit is normally open between the first and second electrical conductors, but is closed when the first and second electrical conductors are bridged by urine; and the means for electronically detecting urine on the first sensor detects the closing of the first electronic urine detection circuit between the first and second electrical conductors.

9. The animal urine spray monitor according to claim 8, wherein:
 the first urine sensor comprises a carrier sheet strip having first and second major surfaces defined by a length and a width of the carrier sheet strip; and the first and second electrical conductors are printed on a major surface of the carrier sheet strip.

10. The animal urine spray monitor according to claim 1, wherein:
 the first signal generating device, the first urine sensor, and the alarm device are a single integrated unit.

11. The animal urine spray monitor according to claim 1, wherein:
 the first signal generating device and the first urine sensor are a single integrated device; and the alarm device is spaced from the first signal generating device and the first sensor device.

12. The animal urine spray monitor according to claim 1, wherein:
 the first signal generating device, the first urine sensor, and the alarm device are battery powered so that the animal urine spray monitor is a self-contained monitor.

13. The animal urine spray monitor according to claim 1, wherein:
 the means for mounting first urine sensor is a detachable mounting means for detachably mounting the first urine sensor on a generally vertical surface.

14. The animal urine spray monitor according to claim 13, wherein;
 the detachable mounting means is an adhesive mounting means.

15. The animal urine spray monitor according to claim 1, wherein:
 the first electronic urine detection circuit for detecting urine spray includes a second urine sensor having means for mounting the second urine sensor on a generally vertical surface to detect a spraying of urine by an animal on the generally vertical surface; the means of the first electronic urine detection circuit for electronically detecting urine on the first urine sensor also detects urine on the second urine sensor and activates the first signal-generating device to emit a first signal when urine is detected on either the first or second urine sensor.

16. The animal urine spray monitor according to claim 1, wherein:
 the first signal-generating device includes transmitter means for transmitting the first signal of the first signal-generating device as a wireless signal; and
 the alarm device includes receiver means for receiving the first signal transmitted by the first signal-generating device and activating the audio and/or visual alarm.

17. The animal urine spray monitor according to claim 16, including:
 a second electronic urine detection circuit for detecting urine spray; the second electronic urine detection circuit including a second urine sensor having means for mounting the second urine sensor on a generally vertical surface to detect a spraying of urine by an animal on the generally vertical surface, a second signal-generating device, and a means for electronically detecting urine on the second urine sensor and activating the second signal-generating device to emit a second signal; the second signal-generating device includes transmitter means for transmitting the second signal of the second signal-generating device as a wireless signal; and
 the alarm device includes receiving means for receiving the second signal transmitted by the second signal-generating device and activating the audio and/or visual alarm.

18. The animal urine spray monitor according to claim 16, wherein:
 the alarm is an audio and visual alarm; the visual alarm has a first visual indicator that is activated by the first signal from the first signal-generating device and a second visual indicator that is activated by the second signal from the second signal-generating device so that an animal owner is alerted as to which of the urine sensors has been sprayed.

19. A method for detecting a spraying of urine by an animal on a selected wall, door, piece of furniture, curtain, drape, or other generally vertical surface and alerting an animal owner of the spraying occurrence, comprising:
 providing an animal urine spray monitor that includes a first electronic urine detection circuit for detecting urine spray; the first electronic urine detection circuit including a first urine sensor for mounting on a generally vertical surface to detect a spraying of urine by an animal on the generally vertical surface, a first signal-generating device, and a means for electronically detecting urine on the first urine sensor and activating the first signal-generating device to emit a first signal;

mounting the first urine sensor on a generally vertical surface to detect urine spraying;

providing an alarm device that is activated by the first signal of the first signal-generating device to emit an audio and/or visual alarm; and monitoring the alarm device.

20. The method according to claim 19, wherein:

the first signal-generating device includes transmitter means for transmitting the first signal of the first signal-generating device as a wireless signal; and the alarm device includes receiver means for receiving the first signal transmitted by the first signal-generating device and activating the audio and/or visual alarm.

* * * * *